United States Patent [19]

Gliemeroth

[11] 3,998,617
[45] Dec. 21, 1976

[54] METHOD OF IMPROVING THE MECHANICAL STRENGTH OF GLASS

[75] Inventor: Georg Gliemeroth, Mainz-Mombach, Germany

[73] Assignee: Jenaer Glaswerk Schott & Gen., Germany

[22] Filed: Jan. 17, 1972

[21] Appl. No.: 218,130

Related U.S. Application Data

[63] Continuation-in-part of Ser. No. 863,684, Oct. 3, 1969, abandoned.

[30] Foreign Application Priority Data

Oct. 24, 1968  Germany .......................... 1804839

[52] U.S. Cl. .................................. 65/33; 65/30 R; 65/DIG. 14; 106/39.7; 427/372 A; 427/380; 427/401

[51] Int. Cl.² .................. C03B 32/00; C03C 17/22; C03C 3/22

[58] Field of Search .................... 106/39 DV, 39.7; 65/DIG. 14, 33, 30; 117/124 D, 42, 169 A, 124 B; 427/372 A, 380, 401

[56] References Cited

UNITED STATES PATENTS

| | | | |
|---|---|---|---|
| 2,998,675 | 9/1961 | Olcott et al. .................. | 106/39 DV |
| 3,397,076 | 8/1968 | Little et al. ..................... | 117/70 |
| 3,458,552 | 7/1969 | Hauck et al. ................ | 260/448 AD |
| 3,464,880 | 9/1969 | Rinehart .............................. | 161/1 |
| 3,597,252 | 8/1971 | Schroeder .......................... | 106/52 |

Primary Examiner—William H. Schmidt
Attorney, Agent, or Firm—Hill, Gross, Simpson, Van Santen, Steadman, Chiara & Simpson

[57] ABSTRACT

The mechanical strength of glass is improved by applying a fluid epitaxially active crystalline primary layer to a glass plate consisting of a glass inclined to crystallization. The glass plate with the mentioned fluid layer thereon is subjected to a temperature treatment to cause a reaction between the glass plate and the primary layer. During this reaction, the primary layer is effective to cause in and near the surface of the glass plate an elimination of at least a portion of the crystals which have a smaller thermic expansion coefficient than the starting glass of the glass plate.

4 Claims, 1 Drawing Figure

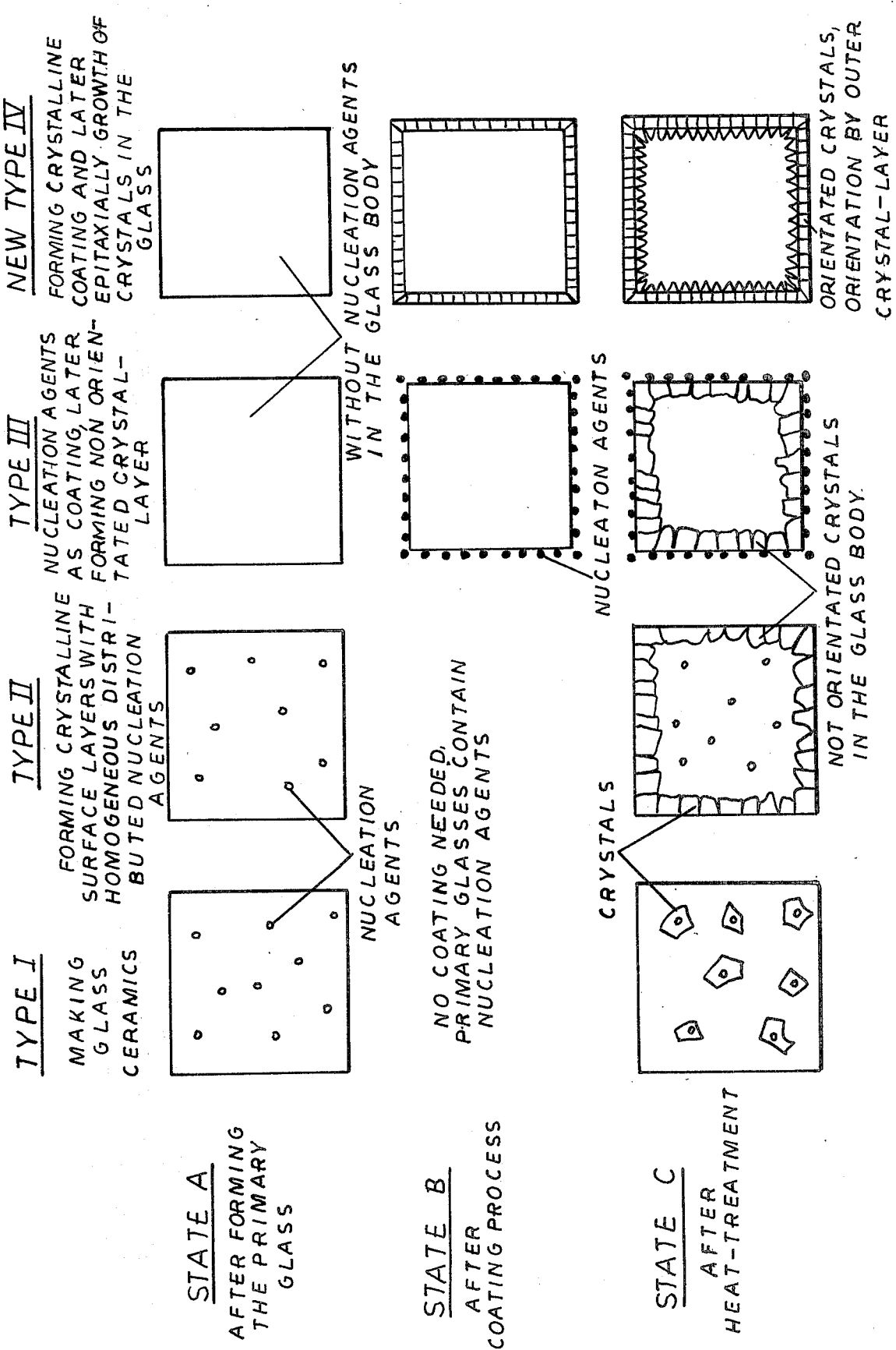

METHOD OF IMPROVING THE MECHANICAL STRENGTH OF GLASS

RELATED APPLICATION

This application is a continuation-in-part of my co-pending application Ser. No. 863,684, filed Oct. 3, 1969, now abandoned.

BACKGROUND OF THE INVENTION

The invention relates to a method for the improvement of the mechanical strength of glass by means of production of crystallized surface layers in the glass through epitaxially controlled surface crystallization. The crystals of this surface layer posses a relatively low thermic coefficient of expansion in comparison with the base glass, so that upon cooling of the glass high compressive stresses are created in the glass surface. These compressive stresses produce the increases in strength.

THE PRIOR ART

For different purposes of utilization glasses with increased mechanical strength are required. The increased strength may be achieved through compressive stresses in and near the glass surface. Known methods for the production of such compressive stresses in and near the glass surface are the thermic hardening (quenching process), the chemical hardening through ion exchange below the transformation range, the chemical hardening through ion exchange above the transformation range, and the chemical hardening through surface crystallization.

Through the chemical hardening below the transformation range ions originally present in the glass having a smaller ion radius are replaced by ions having larger ion radius, while through the chemical hardening above the transformation range ions with larger ions radius originally present in the glass are replaced by such as have smaller ion radius. The chemical hardening below the transformation range is a volume effect; in the chemical hardening above the transformation range the ion exchange in and near the glass surface produces zones which have a lower coefficient of expansion than the base glass and upon cooling permit corresponding compressive stresses to be produced.

There is further known the chemical hardening according to the surface crystallization method in which either a glass which of itself has a tendency toward crystallization, or a glass in which the region in and near the surface through ion exchange is given a composition which has a tendency toward crystallizaton, due to a content of nucleus-developers is brought to surface crystallization with the aid of a suitable temperature treatment. The base glass composition is in this case initially and entirely or through the ion exchange subsequently in the region of the composition altered by ion exchange so adjusted that crystals are separated out which have a particularly low thermic expansion. The compression stresses thereby resulting in the surface zone produce the increased mechanical strength.

In this method the content of nucleus-developers — in the first order it is a question of $TiO_2$ and similar substances — plays a decisive role. If in this connection one employs the method disclosed in the German Pat. No. 1,265,359, then the content of nucleus-developers, $TiO_2$ or similar substances, must initially be distributed homogeneously in the glass. By means of a suitable temperature treatment the regions in and near the glass surface are brough to crystallization. If the procedure is according to the method indicated in the British Pat. No. 1,089,911, then the base glass does not yet possess any content of nucleus-developers. The latter are only subsequently brought into contact with the glass surface. The nucleus-former is in this case in solution, and the solution is brought into contact with the glass, whereby certain quantities of this nucleus-forming solution adhere to the glass, through a temperature process are converted into oxide form, namely, into $TiO_2$, and then from the outside exert a nucleus-forming action on the glass surface. In this manner there is produced a crystalline glass surface under the influence of the nucleus-formers. In both abovementioned patents an alteration of the glass composition in the surface region by means of ion exchange is not necessary, because the glass composition has of itself already a tendency toward surface crystallization. The two methods differ substantially in that in the one case the nucleus-former, for example titanium oxide, is contained in homogeneous distribution in the glass before the temperature process, while in the other case it is localized solely on the surface of the glass.

Particularly suitable glass compositions for this method of chemical hardening by surface crystallization are described in several patents, such as the above mentioned British Pat. No. 1,089,911, the British Pat. No. 1,089,912 and the British Pat. No. 1,107,539.

Both these prior methods of chemical hardening with surface crystallization have, however, the essential disadvantage that the crystallization in the surface layer does not to the extent necessary for industrial production lead to reproducible layer thicknesses of the crystalline surface. Even with constant base glass composition and uniform temperature conditions, the separation process for the crystals, for example $\beta$-spodumene or $\beta$-eucryptite, is greatly dependent on the structure parameters of the glass. The fact is that glasses having a tendency to crystallization already in non-crystallized condition shown decompositions which only with difficulty are uniformly adjustable in the technological process. Therefore, with similar glass composition and similar temperature treatment, the physical appearance of the crystals separated out varies appreciably, the compressive stressed produced through the layer vary accordingly, and the strength of the end product, be it sheet glass or hollow glass, fluctuates within wide limits.

A further essential disadvantage is produced by the content of nuceus-formers. Regardless of whether these nucleus-formers are present from the beginning in homogeneous distribution in the glass or react subsequently from the surface, the crystallization conditions always lead to a mass crystallization with unfavorable physical appearance of the resultant crystals. There are produced non-uniform, poorly reproducible compressive stress conditions and therewith also poor hardening results.

SUMMARY OF THE INVENTION

The aim of the present invention is therefore a method for the achievement of suitable, unambiguously reproducible stress profiles under industrial conditions and in a simple manner.

This aim is according to the invention attained by proceeding from a base glass which due to its composition has a tendency toward crystallization but does not contain nucleus-formers in form of $TiO_2$ or other components, or contains the same in such low concentration only that no specific nucleus-forming action for crystallization emanates from them.

Thus, the object of the invention is a method of improving the mechanical strength of an article made of crystallizable glass of the lithia-alumina-silica variety and devoid of nucleus-forming ingredients, comprising the steps of applying to said article a coating in the form of a liquid containing compounds which through hydrolysis and pyrolysis are convertible into a crystalline lithium-aluminum-silicate, subjecting said coated article to a drying operation at a temperature sufficiently high to accomplish said conversion but lower than the melting temperature of the crystalline lithium-aluminum-silicate, thereafter subjecting said dried article to a heat treatment at such a temperature and for such a length of time as to cause through epitaxy of said crystalline lithium-aluminum-silicate the formation upon the substrate of crystal phases of lithium-aluminum-silicate which have a lower coefficient of expansion than the substrate, and cooling said article to room temperature.

As epitaxy is designated a crystallographic growth process, in which a crystal phase possesses an influence on a second crystal phase newly occurring in its vicinity (see, for example: Vogel, "Strukture und Kristallisation der Gläser," (Structure and Crystallization of Glasses), Leipzig 1965, page 186; as well as "Journal of the American Ceramic Society", 47 (1964), pages 25–29). In a medium having a tendeancy toward crystallization but not yet crystallized, there occurs at the border surface to a crystallographically arranged medium a separation of growth crystals with the same or similar grid dimensions and orientations as those possessed by the crystallographically arranged medium.

BRIEF DESCRIPTION OF THE DRAWINGS

The accompanying drawing diagrammatically illustrates a glass crystal forming technique of the prior art and the present invention. In the vertical columns, those techniques designated Type I, Type II, and Type III depict the prior art, while that designated New Type IV depicts the present invention. The horizontal rows indicate with captions the different glass states occurring in the practice of these techniques.

DETAILED DESCRIPTION

It was discovered that after such a coating of glasses having a tendency toward crystallization with a crystalline lithium-aluminum-silicate (primary layer), the subsequent surface crystallization of the glass body, starting at the contact surface between the glass and said primary layer, takes place appreciably more uniformly and due to the epitaxial effect of the primary layer above all according to a predetermined crystal appearance.

The problem of coating a glass thinly and uniformly with a crystalline phase can in accordance with the invention be solved by applying to the base glass a solution or liquid which is so composed that after its hydrolysis and/or drying and/or pyrolysis the components remain as residue on an arbitrary substrate in the stoichiometric proportions which are necessary for the build-up of the crystal phases desired for the epitaxial lithium-aluminum-silicate layer.

It was found that the formation of the crystalline reaction phase takes place at lower tempatures than the melting temperature when the components in mixed form react through hydrolysis and/or drying and/or pyrolysis in an oxygen-containing atmosphere.

Thus, with this solution or liquid the lithium-aluminum-silicate layer is produced. As particularly suitable organic solutions or liquids were found which from metal alcoholates and/or metal halogenides and/or metal halogen alcoholates and/or esters and/or soluble inorganic salts in suitable concentraiton after the hydrolysis and/or drying and/or pyrolysis already at temperatures which lie below the known melting temperature of the crystalline phase of the lithium-aluminum-silicate, provide the desired crystals.

For the production of the solution or liquid from which by means of hydrolysis and/or drying and/or pyrolysis the crystalline primary layer is produced, in the first place metal alcoholate, metal halogenide, metal halogen alcoholate and/or ester and/or soluble inorganic salts may be used. A solution from which the crystalline phases of the epitaxially effective primary layer may occur on the basis of the lithium-aluminum-silicate, may be produced, for example, from a suitable stoichiometric mixture of silicon methylate or silicon ethylate with aluminum butylate or aluminum propylate and lithium ethylate or lithium propylate or lithium isopropylate or lithium butylate. Besides the metal alcoholates of the corresponding metals also pyrolytically decomposable esters, metal halogenides or inorganic salts may be used.

A glass body to be hardened from such a glass which tends to crystallization, and which upon crystallization with separate out the same phase in the glass that is to be produced through hydrolysis and/or drying and/or pyrolysis from the solution intended for the formation of the lithium-aluminum-silicate layer, is immersed in the mentioned solution or liquid at the places which later through surface crystallization are to be placed under compressive stress, or is sprayed with this solution or moistened in some other manner. Thus, a thin layer of the solution remains adhering to the glass body to be hardened.

By the subsequent drying, hydrolysis and/or pyrolysis the solution adhering to the glass body to be hardened is destroyed; the non-vaporizing components of the solution or liquid react through suitable temperature treatment to the crystalline phase of the epitaxial primary layer.

The heat treatment in accordance with the invention is carried out at such a temperature and for such a length of time as to cause through epitaxy of said crystalline lithium-aluminum-silicate the formation upon the substrate of crystal phases of lithium-aluminum-silicate which have a lower coefficient of expansion than the substrate.

Thus, for example, in accordance with the invention a temperature course was determined which commences with a rise in temperature up to the pyrolysis temperature and is limited in its speed through bubble-formation in the adherent solution, exceeds the same after pyrolysis has taken place, and rises further to the reaction temperature. At the reaction temperature the crystalline components of the epitaxially active primary layer are formed.

The crystal layer produced under the epitaxial action of the primary layer in the glass surface shows a substantially more uniform crystal appearance, a more uniform and even growth speed of the desired crystals, and therefore also more uniform and even, reproducible compressive stress zones at suitable selection of the crystal phase than can be observed in the case of crystal layers which in the crystal separation with use of nucleus-formers according to the conventional methods of the chemical hardening through surface crystallization. Suitable compositions which in contrast to the previously known compositions are to be melted to surface crystallization without nucleus-formers and according to the invention under the epitaxial effect of a primary layer reveal surface crystallization, are produced from mixtures containing in percent by weight the following ingredients:

| | | | | |
|---|---|---|---|---|
| $SiO_2$ | — | 52.36 | to | 66.80 |
| $Al_2O_3$ | — | 4.91 | to | 31.09 |
| $Li_2O$ | — | 3.75 | to | 8.55 |
| $B_2O_3$ | — | 0 | to | 14.73 |
| $MgO$ | — | 0 | to | 6.60 |
| $CaO$ | — | 0 | to | 3.55 |
| $P_2O_5$ | — | 0 | to | 9.95 |
| $Na_2O$ | — | 0 | to | 8.56 |
| $K_2O$ | — | 0 | to | 3.46 |
| $ZrO_2$ | — | 0 | to | 0.50 |
| $PbO$ | — | 0 | to | 0.63 |
| $As_2O_3$ | — | 0 | to | 0.30 |

The following Table sets forth a number of exemplary compositions, all within the percentage ranges specified above.

Table

| — | (percents by weight) | | | | | |
|---|---|---|---|---|---|---|
| | 1 | 2 | 3 | 4 | 5 | 6 |
| $SiO_2$ | 60.48 | 52.36 | 66.80 | 62.43 | 57.08 | 54.93 |
| $Al_2O_3$ | 28.60 | 31.09 | 4.91 | 15.10 | 21.33 | 26.68 |
| $B_2O_3$ | — | 3.86 | 14.73 | — | 3.05 | 0.58 |
| $MgO$ | 4.43 | 0.48 | — | 2.03 | 3.81 | 3.66 |
| $CaO$ | — | — | 0.95 | 2.00 | — | — |
| $P_2O_5$ | — | — | 1.01 | — | 8.33 | — |
| $Na_2O$ | 0.20 | 3.70 | 1.96 | 8.56 | — | 5.10 |
| $K_2O$ | — | — | 2.95 | 3.02 | — | 3.46 |
| $Li_2O$ | 5.99 | 7.53 | 6.38 | 6.04 | 6.09 | 4.94 |
| $ZrO_2$ | — | 0.17 | — | 0.50 | — | — |
| $PbO$ | — | 0.50 | — | — | — | 0.63 |
| $As_2O_3$ | 0.29 | 0.29 | 0.29 | 0.30 | 0.30 | — |

| — | 7 | 8 | 9 | 10 | 11 |
|---|---|---|---|---|---|
| $SiO_2$ | 56.36 | 62.25 | 58.65 | 54.16 | 53.25 |
| $Al_2O_3$ | 21.99 | 25.55 | 27.65 | 26.63 | 14.60 |
| $B_2O_3$ | 2.28 | 2.00 | 2.05 | — | 8.50 |
| $MgO$ | 3.76 | — | — | 3.78 | 6.60 |
| $CaO$ | — | — | — | — | 3.55 |
| $P_2O_5$ | 9.95 | — | — | 9.75 | 2.40 |
| $Na_2O$ | — | 3.00 | 2.95 | — | 7.05 |
| $K_2O$ | — | — | — | 0.60 | — |
| $Li_2O$ | 5.35 | 6.95 | 8.55 | 4.88 | 3.75 |
| $ZrO_2$ | — | — | — | — | — |
| $PbO$ | — | — | — | — | — |
| $As_2O_3$ | 0.30 | 0.25 | 0.15 | 0.20 | 0.30 |

These compositions have a tendency toward separation of lithium-aluminum-silicate crystals. The separating mechanism of lithium-aluminum-silicate crystal phases with relatively low thermic coefficients of expansion by a suitable heat treatment produces after the cooling of the glasses in the glass surface compressive stresses, as is described in the U.S. Pat. No. 2,998,675.

The production of the glasses takes place according to known methods from correspondingly composed batches in smelting containers made of ceramic or precious metal. The clarification and shaping of the glasses are dependent upon the particular viscosity behavior of the individual glasses. After the shaping of the glasses follows a cooling process known from customary glass production methods. Up to this finished stage, including the cooling process, the glasses show no crystallization.

In this known method of glass production attention must, however, in contrast to the production of the ordinary technical glasses, be paid to the index of refraction which on account of the evaporation of individual glass components may change under certain circumstances. It was found that through accurate adjustment of the refraction index of the glass to the refraction index of the crystal phases resulting later through surface crystallization mechanically strengthened glasses may be produced which are transparent. In this connection, the refraction index of the glass matrix surrounding such crystals must corresponds as closely as possible to that of the crystals.

EXAMPLE 1

A small glass plate produced according to composition 5 in the Table and having the dimensions 20 × 30 × 3 mm is immersed in a mixture of 32 grams of silicon methylate, 51 grams of aluminum butylate, 17 grams of lithium butylate, and 30 grams of methyl alcohol at room temperature and after 5 minutes removed again. At a speed of 10° C per minute the small moistened glass plate is heated in an electric furnace to 480° C, left at this temperature for 10 minutes and subsequently cooled at 20° C per minute to room temperature. The small plate carries thereafter a coherent layer a few $\mu$m thick on the surface; the glass surface shows, however, no indication of crystallization. Subsequently the small glass plate is heated in an electric furnace at a speed of 30° C per minute to 805° C, tempered at 850° C from 5 minutes, and subsequently cooled at a cooling speed of 30° C per minute to room temperature. In the glass surface crystals are now clearly recognizable under the light microscope. At a 1 mm thick cross-section through the glass sample a compressive stress of 12,000 m $\mu$/cm may be measured with stress optical means which prevails in a layer of 150 $\mu$.

EXAMPLE 2

A glass plate made from a molten composition 7 in the Table and having the dimensions 30 × 60 × 5 mm is immersed at room temperature for 10 minutes in a mixture of 606 grams of silicon ethylate, 297 grams of aluminum propylate, 96 grams of lithium propylate and 200 grams of ethyl alcohol, then after removal of the glass test-piece from this solution the small moistened glass plate is heated in an electric furnace to 423° C at a speed of 10° C per minute, tempered at this temperature for 20 minutes and subsequently further heated at a speed of 30° C per minute to 760° C. At 760° C the small plate is tempered for 30 minutes and then cooled at a speed of 30° C per hour to room temperature. After this treatment the small plate shows in cross-section clearly a crystallization zone in and near the glass surface with a thickness of 200 $\mu$m. The strength of the small plate as compared with an untreated small plate has increased by the factor 10.

EXAMPLE 3

A small glass plate made from the molten composition 8 of the Table and having the dimensions 20 × 80 × 5 mm is immersed at room temperature in a mixture of 482 grams of silicon methylate, 390 grams of aluminum butylate and 127 grams of lithium butylate for 5 minutes, subsequently removed from the solution, heated in a drying oven at a speed of 8° C per minute to a temperature of 500° C, tempered there for 20 minutes, and thereafter cooled at a speed of 80° C per hour. Subsequently the small plate which in the glass surface shows no crystallization effects at all and is covered by a layer a few μm thick which has the appearance of a dereflection layer, is heated in an electric furnance at a speed of 30° C per hour to 760° C, tempered for 1 hour at this temperature, and thereafter cooled at a speed of 55° C to room temperature. The glass test piece shows under the light microscope a distinct crystallization layer in the surface with a thickness of 250 μm and in a mechanical stength test a strength approximately 12 times the strength of an untreated test piece.

EXAMPLE 4

A small glass plate produced from the composition 10 of the Table and having the dimensions 20 × 30 × 3 mm is immersed for 10 minutes at room temperature in a mixture of 203 grams of silicon methylate, 658 grams of aluminum butylate, 139 grams of lithium methylate and 50 grams of ethyl alcohol, thereafter heated at 100° C per hour to 600° C, after attainment of this temperature immediately cooled off to room temperature at a speed of 200 C per hour, then in an electric furnace at a speed of 300° C per hour brought to 820° C and thereafter cooled again at 70° C per hour. The small plate shows under the light microscope at a 100-fold enlargement a very uniform crystallization zone of 180μm thickness in and near the surface; the crystals are of a long, spiky appearance. The stress birefringence determined at a cross-section of the small plate shows compressive stresses of 10,500 m μ/cm.

What I claim is:

1. A method of improving the mechanical strength of a preformed article of manufacture comprised of crystallizable lithiaalumino-silicate glass devoid of nucleating agents comprising the steps of (A) applying to said article in an uncrystallized state a coating composition comprising a stoichiometric mixture of compounds which through heating is convertible into an epitaxially effective crystalline lithia-alumino-silicate layer, (B) heating said so-coated article to temperatures sufficiently high to accomplish said conversion but lower than the melting temperatures of crystalline lithia-alumino-silicate, and (C) further heating said so heat treated article at elevated temperatures amd for a length of time sufficient to cause the formation in the surface of said article adjacent said layer crystal phases of lithia-alumino-silicate which have a lower coefficient of thermal expansion than the uncrystallized lithia-alumino-silicate comprising said article.

2. The method claim 1 wherein said preformed article comprises a glass produced from a mixture comprising in percent by weight the following ingredients:

| | | | | |
|---|---|---|---|---|
| $SiO_2$ | — | 52.36 | to | 66.80 |
| $Al_2O_3$ | — | 4.91 | to | 31.09 |
| $Li_2O$ | — | 3.75 | to | 8.55 |
| $B_2O_3$ | — | 0 | to | 14.73 |
| $MgO$ | — | 0 | to | 6.60 |
| $CaO$ | — | 0 | to | 3.55 |
| $P_2O_5$ | — | 0 | to | 9.95 |
| $Na_2O$ | — | 0 | to | 8.56 |
| $K_2O$ | — | 0 | to | 3.46 |
| $ZrO_2$ | — | 0 | to | 0.50 |
| $PbO$ | — | 0 | to | 0.63 |
| $As_2O_3$ | — | 0 | to | 0.30 |

3. The method of claim 1 wherein said compounds are selected from the group consisting of metal alcoholates, metal halogenides, metal halogen alcoholates and esters, and inorganic soluble salts, said coating being applied as an alcoholic solution.

4. A method of improving the mechanical strength of preformed articles of manufacture comprised of crystallizable lithia-alumino-silicate glass devoid of nucleating agents, said glass being produced by heat fusing a mixture comprising in percent by weight the following ingredients:

| | | | | |
|---|---|---|---|---|
| $SiO_2$ | — | 52.36 | to | 66.80 |
| $Al_2O_3$ | — | 4.91 | to | 31.09 |
| $Li_2O$ | — | 3.75 | to | 8.55 |
| $B_2O_3$ | — | 0 | to | 14.73 |
| $MgO$ | — | 0 | to | 6.60 |
| $CaO$ | — | 0 | to | 3.55 |
| $P_2O_5$ | — | 0 | to | 9.95 |
| $Na_2O$ | — | 0 | to | 8.56 |
| $K_2O$ | — | 0 | to | 3.46 |
| $ZrO_2$ | — | 0 | to | 0.50 |
| $PbO$ | — | 0 | to | 0.63 |
| $As_2O_3$ | — | 0 | to | 0.30 | said method comprising the steps of
A. coating to said article in an uncrystallized state with an organic solution of a mixture of substances selected from the group consisting of metal alcoholates, metal halogenides, metal halogen alcoholates and esters, and inorganic soluble salts, said mixture being thermally convertible into an epitaxially effective crystalline lithia-alumino-silicate,
B. heating the so-coated article in an oxygen containing atmosphere at temperatures sufficiently high to accomplish said conversion of said coating but lower than the melting temperature of crystalline lithia-alumino-silicate, and
C. further heating the so-heat treated article at elevated temperatures and for a length of time sufficient to cause through epitaxy of said coating the formation in the surface of said article adjacent said coating crystal phases of lithia-alumino-silicate which have a lower coefficient of thermal expansion than the uncrystallized lithia-alumina-silica comprising said article.

* * * * *